US012771683B2

(12) United States Patent
Takeuchi

(10) Patent No.: US 12,771,683 B2
(45) Date of Patent: Oct. 20, 2026

(54) INFORMATION PROCESSING APPARATUS THAT DISPLAYS A SCREEN WITH GUIDANCE TO CAUSE DISPLAY OF A SCREEN OF ANOTHER APPLICATION RELATING TO AN ACCESS POINT PASSWORD, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Takuya Takeuchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 18/818,724

(22) Filed: Aug. 29, 2024

(65) Prior Publication Data

US 2025/0088501 A1 Mar. 13, 2025

(30) Foreign Application Priority Data

Sep. 12, 2023 (JP) ................................ 2023-147894

(51) Int. Cl.
*H04L 9/40* (2022.01)
*G06F 9/54* (2006.01)

(52) U.S. Cl.
CPC ............ *H04L 63/083* (2013.01); *G06F 9/543* (2013.01)

(58) Field of Classification Search
CPC ..... H04L 63/083; H04L 9/0894; G06F 9/543; G06F 3/1236; G06F 3/1292;
(Continued)

(56) References Cited

U.S. PATENT DOCUMENTS 5,659,791 A * 8/1997 Nakajima ............. G06F 9/4493 715/202
6,177,935 B1 * 1/2001 Munn ..................... G06F 9/451 715/777
(Continued)

FOREIGN PATENT DOCUMENTS

JP 2006121342 A 5/2006

OTHER PUBLICATIONS

"Wi-Fi Password Manager MOD APK (Pro Unlocked) 1.0.65," apkmb.com, Jul. 8, 2023, pp. 1-3, XP093244117, Retrieved from the Internet: URL:https://web.archive.org/web/20230708000727/https://apkmb.com/wi-fi-password-manager-apk/#!/ tu7n5TGpXE.
(Continued)

*Primary Examiner* — Aravind K Moorthy
(74) *Attorney, Agent, or Firm* — Venable LLP

(57) ABSTRACT

An information processing apparatus including a predetermined application program, displays, by the predetermined application program, a predetermined screen for prompting a user to execute a predetermined function that is a function of saving, in a clipboard, a predetermined password that is a password managed by another application program different from the predetermined application program and is a password of an access point outside the information processing apparatus; and transmits, by the predetermined application program, to a communication apparatus outside the information processing apparatus, setting information, including the predetermined password, for connection to the access point, after the predetermined screen is displayed.

26 Claims, 9 Drawing Sheets

(58) Field of Classification Search
CPC ... H04W 12/068; H04W 12/55; H04W 12/73; H04W 84/12; H04W 12/0433
See application file for complete search history.

(56) References Cited

U.S. PATENT DOCUMENTS 8,590,030 B1 * 11/2013 Pei ..................... H04L 63/0838 726/9
9,071,967 B1 * 6/2015 Davies ................ H04W 12/069
9,258,120 B1 * 2/2016 Allen ................... H04L 9/0891
9,424,419 B1 * 8/2016 Kruse ................... G06F 21/31
9,460,293 B1 * 10/2016 Kashyap ................ G06F 21/60
9,514,333 B1 * 12/2016 Patel .................... G06Q 30/016
9,705,857 B1 * 7/2017 Koller ................... H04L 63/062
10,045,216 B1 * 8/2018 Indurkar ............. H04W 12/068
10,447,786 B1 * 10/2019 Arnberg ............... H04W 12/35
10,567,962 B1 * 2/2020 Lu ........................ H04W 12/08
10,575,347 B2 * 2/2020 Mazandarany ....... H04W 76/11
10,686,984 B1 * 6/2020 Schmidt ................ H04N 23/66
10,742,649 B1 * 8/2020 Hook, Jr. ............ H04L 63/0272
10,846,415 B1 * 11/2020 Zargarian ............. G06F 21/606
10,860,704 B1 * 12/2020 Edwards ............... G06V 20/20
10,866,711 B1 * 12/2020 Campbell .............. G06F 21/16
10,871,894 B2 * 12/2020 Polyulya ............. G06F 3/04883
10,885,525 B1 * 1/2021 Sharafi ............... G06Q 20/3674
10,917,400 B1 * 2/2021 Goings ............... H04L 63/0815
11,243,688 B1 * 2/2022 Remy ................. G06F 3/04886
11,501,016 B1 11/2022 Peterson
11,509,738 B2 * 11/2022 Parker ................ H04L 63/0869
11,516,266 B1 * 11/2022 Ramachandran ....... H04L 65/60
11,822,680 B1 * 11/2023 Speers ................... G06F 9/543
11,882,117 B1 * 1/2024 Kumar ................. H04W 12/35
11,895,493 B1 * 2/2024 Case, Jr ............. H04W 12/068
11,916,910 B1 * 2/2024 Shukla ................. H04W 12/06
12,096,215 B2 * 9/2024 Kawaura .............. G06F 3/1238
2002/0178370 A1 * 11/2002 Gurevich ............... G06F 21/34 713/184
2007/0039042 A1 * 2/2007 Apelbaum ................ H04L 9/14 726/6
2007/0282951 A1 * 12/2007 Selimis ................... H04L 67/75 709/205
2008/0022379 A1 * 1/2008 Wray .................... G06F 21/604 726/6
2008/0046983 A1 * 2/2008 Lester ..................... H04L 63/08 726/5
2008/0072053 A1 * 3/2008 Halim ................. H04L 63/0815 713/176
2010/0146611 A1 * 6/2010 Kuzin ................. H04L 63/0815 726/8
2012/0174211 A1 * 7/2012 Suzuki ............... H04L 63/0838 726/18
2013/0007858 A1 * 1/2013 Shah ................ H04W 12/0431 726/6
2013/0089001 A1 * 4/2013 Dattagupta ........... H04W 48/20 370/255
2013/0145006 A1 * 6/2013 Tammam ............. G06F 9/5027 709/223
2013/0173702 A1 * 7/2013 Lang ..................... H04W 12/08 709/204
2013/0326371 A1 * 12/2013 Xu ....................... H04L 67/568 709/204
2014/0010225 A1 * 1/2014 Puregger ............... H04W 12/08 370/338
2014/0026192 A1 * 1/2014 Gatewood ........... H04L 63/0884 726/4
2014/0120516 A1 * 5/2014 Chiang .................... G09B 5/02 434/362
2014/0137220 A1 * 5/2014 Niemela ................. G06F 21/31 726/6
2014/0165147 A1 * 6/2014 Hershberg ............ H04L 63/083 726/4
2014/0173295 A1 * 6/2014 Goel ..................... G06F 21/602 713/193
2014/0250513 A1 * 9/2014 Cao ....................... H04W 12/50 726/7
2014/0267339 A1 * 9/2014 Dowd ..................... G06F 9/543 709/219
2014/0293331 A1 * 10/2014 Asai ...................... G06F 3/1204 358/1.15
2015/0124791 A1 * 5/2015 Mazandarany ....... H04W 12/04 370/338
2015/0124966 A1 * 5/2015 Smedman ............ H04W 48/18 380/270
2015/0213320 A1 * 7/2015 Ookawara ............. G06V 30/32 715/268
2015/0222637 A1 * 8/2015 Hung ........................ G06F 9/54 726/1
2015/0244422 A1 * 8/2015 Ohashi ..................... H04B 5/45 455/41.1
2015/0249656 A1 * 9/2015 Wu ....................... H04W 12/06 726/7
2015/0289295 A1 * 10/2015 Granbery ............. H04W 12/04 370/230
2015/0296377 A1 * 10/2015 Sheu ..................... H04W 12/06 380/279
2016/0007387 A1 * 1/2016 Adib ..................... H04L 67/535 370/329
2016/0094560 A1 * 3/2016 Stuntebeck ........... G06F 3/0481 726/1
2016/0127352 A1 * 5/2016 Xu ...................... H04L 63/0815 726/8
2016/0131385 A1 * 5/2016 Poplawski .......... H04L 12/2807 700/278
2016/0139766 A1 * 5/2016 Kim .................... G06F 3/04842 715/802
2016/0191499 A1 * 6/2016 Momchilov ............ G06F 21/78 713/171
2016/0198403 A1 * 7/2016 Sumiuchi .............. H04W 48/20 455/434
2016/0248744 A1 * 8/2016 Adderly ................ H04L 63/102
2016/0286592 A1 * 9/2016 Suzuki .................. H04W 24/10
2016/0360407 A1 * 12/2016 Benoit .................. H04W 12/06
2017/0026353 A1 * 1/2017 Chen ..................... H04L 63/061
2017/0200003 A1 * 7/2017 Zaver .................... H04L 9/0656
2017/0264822 A1 * 9/2017 Shen ...................... G11B 27/34
2018/0012044 A1 * 1/2018 Lo .......................... G06F 21/71
2018/0067785 A1 * 3/2018 Crowe .................... G06F 9/543
2018/0081678 A1 * 3/2018 Werner ...................... G06F 8/71
2018/0109418 A1 * 4/2018 Cammarota .......... H04W 12/50
2018/0332041 A1 * 11/2018 Fan ....................... H04W 12/35
2018/0335998 A1 * 11/2018 Callaghan ........... H04L 67/1095
2019/0028485 A1 * 1/2019 Baird .................... H04L 67/146
2019/0058707 A1 * 2/2019 Chung .................. H04L 63/102
2019/0069330 A1 * 2/2019 Ebrahimi Afrouzi ........................ H04L 63/083
2019/0090133 A1 * 3/2019 Wang .................. H04L 63/0876
2019/0132303 A1 * 5/2019 Kurian .................... H04L 63/08
2019/0166637 A1 * 5/2019 Shibao .................. H04W 48/16
2019/0205647 A1 * 7/2019 Kumar ............. G06Q 10/06316
2019/0253243 A1 * 8/2019 Zimmerman ........... H04W 4/80
2019/0278431 A1 * 9/2019 Dunning .......... G06Q 10/06315
2019/0289059 A1 * 9/2019 Vanahalli ............. H04L 63/061
2019/0303596 A1 * 10/2019 Du ........................ G06F 21/629
2019/0313421 A1 * 10/2019 Park ...................... H04W 48/18
2019/0325016 A1 * 10/2019 Nicholson ............... G06F 9/543
2019/0372949 A1 * 12/2019 Sanciangco ........... H04W 12/50
2019/0373469 A1 * 12/2019 Bradley .................. H04L 67/51
2019/0386984 A1 * 12/2019 Thakkar .................. H04L 63/18
2020/0015307 A1 * 1/2020 Naka ..................... H04W 76/18
2020/0042329 A1 * 2/2020 Guidotti .............. G06F 9/44505
2020/0077252 A1 * 3/2020 Karaki .................... H04L 67/34
2020/0084297 A1 * 3/2020 Shimada ............... G06F 3/1204
2020/0153815 A1 * 5/2020 Yehuda ............... H04W 12/068
2020/0162633 A1 * 5/2020 Ikeda ................. H04N 1/32776
2020/0169953 A1 * 5/2020 Sekiguchi ............... H04L 63/00
2020/0210565 A1 * 7/2020 Sidorov ................ G06F 21/554
2020/0236737 A1 * 7/2020 Ye ........................ H04W 12/06
2020/0244892 A1 * 7/2020 Arai ..................... G06V 30/153
2020/0257576 A1 * 8/2020 Gallagher ............ G06F 3/0482
2020/0288222 A1 * 9/2020 Mathews ................ H04W 4/80

(56) References Cited

U.S. PATENT DOCUMENTS

| | | | | |
|---|---|---|---|---|
| 2020/0311250 | A1* | 10/2020 | Sandstrom | G06F 21/36 |
| 2020/0356656 | A1* | 11/2020 | Chhabra | G06F 9/451 |
| 2020/0364290 | A1* | 11/2020 | Bose | H04L 67/535 |
| 2020/0387594 | A1* | 12/2020 | Sandstrom | G06F 21/316 |
| 2021/0004472 | A1* | 1/2021 | Almeida | G06F 21/602 |
| 2021/0058787 | A1* | 2/2021 | Isgar | H04W 84/12 |
| 2021/0076216 | A1* | 3/2021 | Hotchkiss | H04W 12/069 |
| 2021/0271774 | A1* | 9/2021 | Kim | G06F 3/0488 |
| 2021/0298095 | A1* | 9/2021 | Ergen | H04L 61/50 |
| 2021/0306316 | A1* | 9/2021 | Rolf | H04L 63/083 |
| 2021/0306317 | A1* | 9/2021 | Rolf | H04L 63/10 |
| 2021/0306333 | A1* | 9/2021 | Rolf | H04L 63/0884 |
| 2021/0390001 | A1* | 12/2021 | Walters | G06F 9/543 |
| 2021/0392576 | A1* | 12/2021 | Ergen | H04M 15/8038 |
| 2021/0409976 | A1* | 12/2021 | Ergen | H04W 72/541 |
| 2022/0067214 | A1* | 3/2022 | Preiss | G06F 21/45 |
| 2022/0070000 | A1* | 3/2022 | Gondza | H04L 63/123 |
| 2022/0108060 | A1* | 4/2022 | Lv | G06F 3/0485 |
| 2022/0121505 | A1* | 4/2022 | Shetty | G06F 9/45529 |
| 2022/0188450 | A1* | 6/2022 | Singh | G06F 21/46 |
| 2022/0210187 | A1* | 6/2022 | Wing | H04L 51/212 |
| 2022/0264446 | A1 | 8/2022 | Hoashi | |
| 2022/0284089 | A1* | 9/2022 | Kanevsky | G06F 21/57 |
| 2022/0311626 | A1* | 9/2022 | Gundavelli | H04L 9/0894 |
| 2022/0311767 | A1* | 9/2022 | Ouellet | H04L 12/12 |
| 2022/0360987 | A1* | 11/2022 | Brown | H04W 12/04 |
| 2022/0366068 | A1* | 11/2022 | Sankar | G06F 16/2379 |
| 2022/0408268 | A1* | 12/2022 | Johnston | G06F 3/165 |
| 2023/0026096 | A1* | 1/2023 | Zheng | H04N 21/47815 |
| 2023/0057920 | A1* | 2/2023 | Ikeoka | H04W 48/16 |
| 2023/0072072 | A1* | 3/2023 | Valecha | H04L 63/083 |
| 2023/0098097 | A1* | 3/2023 | Vaid | H04W 12/033<br>726/1 |
| 2023/0115108 | A1* | 4/2023 | Ishizu | H04W 12/06<br>713/155 |
| 2023/0123446 | A1* | 4/2023 | Singh | G06F 21/31<br>726/26 |
| 2023/0135589 | A1* | 5/2023 | Rodriguez Bravo | H04W 84/12<br>370/329 |
| 2023/0135980 | A1* | 5/2023 | Konji | H04W 48/08<br>370/329 |
| 2023/0188660 | A1* | 6/2023 | Ehara | H04N 1/32662<br>358/1.14 |
| 2023/0198981 | A1* | 6/2023 | Nair | G07C 9/00571<br>726/7 |
| 2023/0199488 | A1* | 6/2023 | Del Sordo | H04W 76/11<br>726/5 |
| 2023/0254203 | A1* | 8/2023 | Tenkod | H04L 63/083<br>370/338 |
| 2023/0259312 | A1* | 8/2023 | Nakamura | G06F 3/121<br>358/1.15 |
| 2023/0276511 | A1* | 8/2023 | Torikai | H04W 4/80<br>455/41.2 |
| 2023/0297217 | A1* | 9/2023 | Catling | G06F 40/20<br>715/770 |
| 2023/0336995 | A1* | 10/2023 | Hu | H04W 12/08 |
| 2023/0354449 | A1* | 11/2023 | Konji | H04W 76/10 |
| 2023/0363022 | A1* | 11/2023 | Takarabe | H04W 12/04 |
| 2023/0388181 | A1* | 11/2023 | Inagaki | H04W 24/02 |
| 2023/0388916 | A1* | 11/2023 | Sugawara | H04W 12/77 |
| 2023/0394135 | A1* | 12/2023 | Cox | G06F 21/46 |
| 2024/0015509 | A1* | 1/2024 | Kopka | H04W 12/069 |
| 2024/0049334 | A1* | 2/2024 | Yatagai | H04W 76/25 |
| 2024/0073230 | A1* | 2/2024 | Devane | H04L 63/1425 |
| 2024/0118948 | A1* | 4/2024 | Carver | G06F 3/04842 |
| 2024/0152411 | A1* | 5/2024 | Jones | G06F 9/543 |
| 2024/0179028 | A1* | 5/2024 | Wang | H04L 12/4641 |
| 2024/0265084 | A1* | 8/2024 | Vajravel | G06F 21/53 |
| 2024/0314865 | A1* | 9/2024 | Tsuji | H04W 76/15 |
| 2024/0340289 | A1* | 10/2024 | Koral | H04L 63/108 |
| 2024/0365411 | A1* | 10/2024 | Wong | H04W 12/062 |
| 2025/0005119 | A1* | 1/2025 | Hobson | G06F 21/83 |
| 2025/0023869 | A1* | 1/2025 | Snay | H04L 63/20 |
| 2025/0045364 | A1* | 2/2025 | Neighbour | G06F 21/31 |
| 2026/0067335 | A1* | 3/2026 | Tran | G06F 21/6245 |

OTHER PUBLICATIONS

Extended European Search Report dated Feb. 7, 2025 in counterpart European Patent Appln. No. 24198061.4.

* cited by examiner

INFORMATION PROCESSING APPARATUS THAT DISPLAYS A SCREEN WITH GUIDANCE TO CAUSE DISPLAY OF A SCREEN OF ANOTHER APPLICATION RELATING TO AN ACCESS POINT PASSWORD, CONTROL METHOD, AND NON-TRANSITORY COMPUTER-READABLE STORAGE MEDIUM STORING PROGRAM

BACKGROUND OF THE INVENTION

Field of the Invention

The present invention relates to an information processing apparatus for executing setting of connection to a communication apparatus, a control method, and a non-transitory computer-readable storage medium storing a program.

Description of the Related Art

As a method in which an information processing apparatus such as a smartphone is connected to a communication apparatus such as a network printer by a communication method such as wireless LAN communication, there is known a method of performing connection via an external apparatus such as a wireless LAN router. This connection method will be referred to as infrastructure connection hereinafter. The information processing apparatus and the communication apparatus can establish infrastructure connection to perform, for example, bidirectional communication, and can be connected to the Internet to use a service on the Internet. To establish infrastructure connection, it is known that the information processing apparatus transmits, to the communication apparatus, connection information such as a Service Set Identifier (to be referred to as a SSID hereinafter) and a password for connection to an external apparatus, and the communication apparatus executes connection setting for connection to the external apparatus based on the connection information.

Japanese Patent Laid-Open No. 2006-121342 describes a technique of generating a public key and a private key using biological information, acquiring biological information again when decoding data encrypted by the generated public key, and using it as a passphrase.

SUMMARY OF THE INVENTION

It is necessary to improve convenience by eliminating, with a simpler arrangement, erroneous input of information such as a complicated password by the user.

The present invention provides an information processing apparatus for improving convenience in connection setting processing using connection information, a control method, and a non-transitory computer-readable storage medium storing a program.

The present invention in one aspect provides a control method for an information processing apparatus including a predetermined application program, comprising: displaying, by the predetermined application program, a predetermined screen for prompting a user to execute a predetermined function that is a function of saving, in a clipboard, a predetermined password that is a password managed by another application program different from the predetermined application program and is a password of an access point outside the information processing apparatus; and transmitting, by the predetermined application program, to a communication apparatus outside the information processing apparatus, setting information, including the predetermined password, for connection to the access point, after the predetermined screen is displayed.

According to the present invention, it is possible to improve convenience in connection setting processing using connection information.

Further features of the present invention will become apparent from the following description of exemplary embodiments with reference to the attached drawings.

DESCRIPTION OF THE EMBODIMENTS

Figure 1:
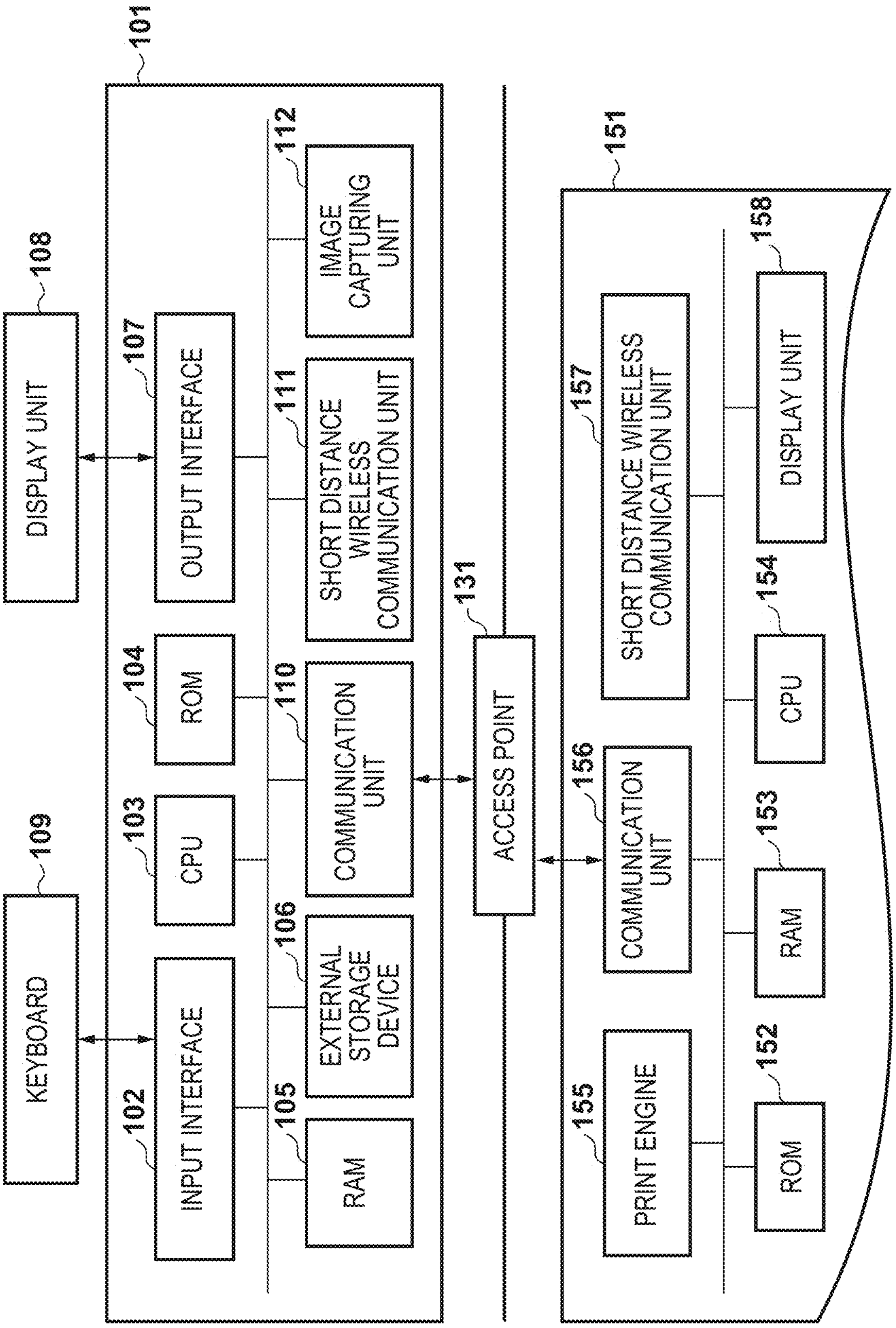
FIG. 1 is a block diagram showing the arrangement of a system including an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing apparatus 101 and a communication apparatus 151 included in a communication system according to this embodiment will be described. In this embodiment, a smartphone is exemplified as the information processing apparatus 101 but the present invention is not limited to this. For example, as the information processing apparatus 101, various kinds of apparatuses such as a portable terminal, a Personal Computer (PC), a tablet terminal, a Personal Digital Assistant (PDA), and a digital camera are applicable. Furthermore, a printer is exemplified as the communication apparatus 151 but the present invention is not limited to this, and various kinds of apparatuses are applicable as long as they can perform wireless communication with the information processing apparatus 101. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

First, components of the information processing apparatus 101 of this embodiment and the communication apparatus 151 which can communicate with the information processing apparatus 101 of this embodiment will be described with reference to a block diagram shown in FIG. 1. Although this embodiment will exemplify the following components, the present invention is not limited to functions shown in FIG. 1. Apparatuses that are applicable to the information processing apparatus 101 and the communication apparatus 151 can appropriately include components corresponding to executable functions.

The information processing apparatus 101 includes an input interface 102, a CPU 103, a ROM 104, a RAM 105, an external storage device 106, an output interface 107, a display unit 108, a communication unit 110, a short distance wireless communication unit 111, and an image capturing unit 112. The CPU 103, the ROM 104, the RAM 105, and the like form a computer of the information processing apparatus 101 for executing a program.

The input interface 102 is an interface for accepting data input and instruction operations from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101 such as execution of an application program. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (setup application) configured to execute a network setup of the communication apparatus 151, a printer management application, a print information generation program that generates print information interpretable by the communication apparatus 151, and the like. Each program is stored in the external storage device 106 by being installed from an external server (not shown) by, for example, Internet communication via the communication unit 110. A service registration application is an application program configured to transmit information acquired from the communication apparatus 151, personal information of the user acquired by the information processing apparatus 101, and the like to a service management server (not shown). The application program (setting application) configured to execute a network setup of the communication apparatus 151 is an application program configured to set an access point as the connection destination of the communication apparatus 151. The printer management application is an application configured to manage information of the printer. Note that the service registration application, the setting application, the printer management application, and the print information generation program (print application) may be formed as one application.

The output interface 107 is an interface configured to perform control for causing the display unit 108 to display data or make a notification concerning the state of the information processing apparatus 101. The display unit 108 is formed by a Light-Emitting Diode (LED), a Liquid Crystal Display (LCD), or the like and displays data or makes a notification concerning the state of the information processing apparatus 101. The image capturing unit 112 is, for example, a camera that captures the outside.

The communication unit 110 is a component connected to the apparatus such as the communication apparatus 151 or an access point 131 to execute data communication. For example, the communication unit 110 can be connected to an access point (not shown) in the communication apparatus 151. The communication unit 110 includes, as an access point in the information processing apparatus 101, an access point for connection to the apparatus such as the communication apparatus 151. This access point is generally called tethering. Note that a communication unit 156 of the communication apparatus 151 can be connected to the access point. When the communication unit 110 enables the access point, the information processing apparatus 101 operates as the access point. When the communication unit 156 and the access point in the communication unit 110 are connected, the information processing apparatus 101 and the communication apparatus 151 can communicate with each other. If the communication unit 110 of the information processing apparatus 101 is connected to the Internet, the communication apparatus 151 can also be connected to the Internet via the information processing apparatus 101. Note that in this embodiment, the information processing apparatus 101 can communicate with the communication apparatus 151 via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. For example, a device such as a wireless LAN router is used as the access point 131. The method of connecting the information processing apparatus 101 and the communication apparatus 151 via the external access point is called an infrastructure connection method.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), a Wi-Fi Aware, or the like is used.

The communication apparatus 151 includes a ROM 152, a RAM 153, a CPU 154, a print engine 155, the communication unit 156, the short distance wireless communication unit 157, and a display unit 158. The ROM 152, the RAM

153, the CPU 154, and the like form a computer of the communication apparatus 151 for executing a program.

The communication unit 156 includes, as the access point in the communication apparatus 151, an access point for connection to the external apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. The wireless communication method used by the communication unit 156 is, for example, a communication standard based on the IEEE 802.11 series. The communication unit 156 may include a hardware component functioning as an access point or may operate as an access point by software for functioning as an access point.

A mode and a connection method of executing wireless communication using the communication unit 156 will now be described.

Direct Connection Method

Direct connection indicates a form in which apparatuses are wirelessly connected directly (that is, by Peer to Peer) without intervention of an external apparatus such as the AP 131. Direct connection is also called Peer to Peer connection (P2P connection). As one connection mode, the communication apparatus 151 can operate in a mode (direct connection mode) for communication by direct connection. In Wi-Fi communication, the mode for communication by direct connection includes a plurality of modes such as a software AP mode and a Wi-Fi Direct (WFD) mode.

A mode in which direct connection is executed by WFD is called a WFD mode. WFD is a standard developed by Wi-Fi Alliance and is a standard included in the IEEE 802.11 communication standards. In the WFD mode, a device serving as a communication partner is searched for by a device search command, then the roles of a P2P group owner (GO) and P2P client are decided, and remaining wireless connection processing is performed. The group owner corresponds to a Wi-Fi master station (master unit), and the client corresponds to a Wi-Fi slave station (slave unit). This role making corresponds to, for example, Go Negotiation in P2P. Note that in the WFD mode in a state before role making is performed, the communication apparatus 151 is neither the master station nor the slave station. More specifically, first, one of devices to communicate with each other issues a device search command and searches for a device to be connected in the WFD mode. After the other device serving as a communication partner is found, the devices confirm information about services and functions that can be supplied by the respective devices. Note that the device supply information confirmation is an option and is dispensable. The device supply information confirmation phase corresponds to, for example, P2P Provision Discovery. Then, the devices confirm the device supply information and decide, as roles, which device serves as a P2P client and which device serves as a P2P group owner. After the client and the group owner are decided, the devices exchange parameters for performing WFD communication. Based on the exchanged parameters, the P2P client and the P2P group owner perform remaining wireless connection processing and IP connection processing. Note that in the WFD mode, the communication apparatus 151 may always operate as the GO without executing the above-described GO Negotiation. That is, the communication apparatus 151 may operate in the WFD mode that is an Autonomous GO mode. The state in which the communication apparatus 151 operates in the WFD mode is, for example, a state in which WFD connection is not established but the communication apparatus 151 operates as the GO, or a state in which WFD connection is established and the communication apparatus 151 operates as the GO.

In the software AP mode, one device (for example, the information processing apparatus 101) among devices (for example, the information processing apparatus 101 and the communication apparatus 151) to communicate with each other serves as a client that plays a role of requesting various services. The other device implements the function of an access point in Wi-Fi by software setting. The software AP corresponds to a Wi-Fi master station, and the client corresponds to a Wi-Fi slave station. In the software AP mode, the client searches for a device serving as a software AP by a device search command. After the software AP is found, the client and the software AP perform remaining wireless connection processing (establishment of wireless connection and the like) and then IP connection processing (assignment of an IP address and the like). Note that commands and parameters transmitted/received when implementing wireless connection between the client and the software AP suffice to be those defined by the Wi-Fi standard, and a description thereof will be omitted here.

In this embodiment, in a case where the communication apparatus 151 establishes and maintains direct connection, it operates as a master station in a network to which the communication apparatus 151 belongs. Note that the master station is an apparatus that creates a wireless network, and is an apparatus that provides a slave station with parameters used in connection to the wireless network. The parameters used in connection to the wireless network are, for example, parameters about a channel used by the master station. The slave station receives the parameters and is then connected to the wireless network created by the master station using the channel used by the master station. In the direct connection mode, the communication apparatus 151 operates as the master station and can thus decide a specific frequency band and channel to be used for communication in the direct connection method. In this embodiment, the communication apparatus 151 can use a channel corresponding to the 2.4-GHz frequency band and a channel corresponding to the 5-GHz frequency band for communication in the direct connection method.

Infrastructure Connection Method

Infrastructure connection is a connection form in which devices (for example, the information processing apparatus 101 and the communication apparatus 151) to communicate with each other are connected to an access point (for example, the AP 131) that controls a network of the devices, and the devices communicate with each other via the access point. As one connection mode, the communication apparatus 151 can operate in a mode (infrastructure connection mode) for communication by infrastructure connection.

In infrastructure connection, each device searches for an access point by a device search command. After an access point is found, the device and the access point perform remaining wireless connection processing (establishment of wireless connection and the like) and then IP connection processing (assignment of an IP address and the like). Note that commands and parameters transmitted/received when implementing wireless connection between the device and the access point suffice to be those defined by the Wi-Fi standard, and a description thereof will be omitted here.

In this embodiment, when the communication apparatus 151 operates in infrastructure connection, the AP 131 operates as a master station and the communication apparatus 151 operates as a slave unit. That is, in this embodiment, infrastructure connection means connection between the communication apparatus 151 operating as a slave unit and the apparatus operating as a master unit. In a case where the communication apparatus 151 establishes infrastructure connection and the information processing apparatus 101 also establishes infrastructure connection to the AP 131, the communication apparatus 151 and the information processing apparatus 101 can communicate with each other via the AP 131. Since the AP 131 decides a channel to be used for communication in infrastructure connection, the communication apparatus 151 executes communication in infrastructure connection using the channel decided by the AP 131. In this embodiment, the communication apparatus 151 can use a channel corresponding to the 2.4-GHz frequency band and a channel corresponding to the 5-GHz frequency band for communication in infrastructure connection. Note that the communication apparatus 151 can also use a channel corresponding to the DFS band in the 5-GHz frequency band for communication in infrastructure connection. Note also that to communicate with the communication apparatus 151 via the AP 131, the information processing apparatus 101 needs to recognize that the communication apparatus 151 belongs to a network which is formed by the AP 131 and to which the information processing apparatus 101 belongs.

In this embodiment, a state in which the information processing apparatus 101 and the communication apparatus 151 are simply connected to the same AP is considered as an infrastructure connection state. That is, in the infrastructure connection state, the information processing apparatus 101 and the communication apparatus 151 need only be connected to the same AP, and need not recognize that the partner apparatus belongs to the network to which the self-apparatus belongs.

Network Setup Mode

The communication apparatus 151 can operate in the network setup mode. A trigger for the communication apparatus 151 to start an operation in the network setup mode may be, for example, the pressing of a network setup mode button by the user or activation (power-on) of the communication apparatus 151 for the first time after arrival. The network setup mode button may be a hardware (physical) button of the communication apparatus 151 or a software button displayed on the display unit 158 by the communication apparatus 151.

When the communication apparatus 151 starts an operation in the network setup mode, it enables Wi-Fi communication. More specifically, as Wi-Fi communication enabling processing, the communication apparatus 151 enables an internal AP (connection setting AP) of the communication apparatus 151 that is dedicated to the network setup mode. Then, the communication apparatus 151 can establish Wi-Fi direct connection to the information processing apparatus 101. Assume that connection information (Service Set Identifier (SSID) and password) for connection to the connection setting AP is held in advance in a setup application installed in the information processing apparatus 101, and the information processing apparatus 101 recognizes in advance the connection information for connection to the connection setting AP. Therefore, unlike connection information of an AP enabled in the direct connection mode, the connection information for connection to the connection setting AP cannot be changed arbitrarily by the user. Note that in the network setup mode, the communication apparatus 151 may be connected to the information processing apparatus 101 by not normal Wi-Fi but Wi-Fi Direct (WFD). That is, the communication apparatus 151 may operate as a group owner, and receive a setting command from the information processing apparatus 101 by WFD communication. Alternatively, the communication apparatus 151 may be connected to the information processing apparatus 101 by Bluetooth in the network setup mode. Bluetooth includes Bluetooth Classic and Bluetooth Low Energy (BLE). That is, for example, the communication apparatus 151 may operate as a slave apparatus in BLE in the network setup mode, and receive a setting command from the information processing apparatus 101 by BLE communication. Furthermore, in the network setup mode, the communication apparatus 151 may be able to execute both a network setup by Wi-Fi and a network setup by BLE. That is, when the communication apparatus 151 starts an operation in the network setup mode, it may enable both Wi-Fi communication and BLE communication. More specifically, when the communication apparatus 151 starts an operation in the network setup mode, it may enable both the connection setting AP and an advertising state in which BLE connection is enabled by transmitting advertising information by BLE.

When the communication apparatus 151 operates in the network setup mode, it controls the communication unit 156 to operate as a setup access point (connection setting AP) that is enabled only during an operation in the network setup mode. The setup access point is an access point different from that enabled in the above-described software AP mode. Assume that the SSID of the setup access point includes a predetermined character string recognizable by the setting application of the information processing apparatus 101.

Assume that the communication apparatus 151 operating in the network setup mode uses a predetermined communication protocol (setup communication protocol) in communication with the information processing apparatus 101 connected to the setup access point. More specifically, the setup communication protocol is, for example, Simple Network Management Protocol (SNMP).

If a predetermined time elapses after the communication apparatus 151 starts an operation in the network setup mode, the communication apparatus 151 stops the operation in the network setup mode and disables the setup access point. Furthermore, even when the connection information for connection to the AP 131 and a change instruction of the wireless communication operation mode are received from the information processing apparatus 101 in the network setup mode, the setup access point is disabled. Assume that the setup access point is an access point that does not require a password for connection. Note that the setup access point may be an access point that requires a password. In this case, a password used for connection to the setup access point is a fixed password (unchangeable by the user) that is grasped in advance by the setting application.

The communication unit 156 is assigned with a Media Access Control Address (MAC address). The MAC address is an identifier used to identify the communication unit, and is uniquely assigned to each communication unit in all the apparatuses including the communication apparatus and the information processing apparatus. Therefore, the MAC address is often used to identify the individual apparatus. In this embodiment, the identifier used to identify the apparatus will be referred to as apparatus identification information hereinafter. That is, the MAC address is an example of the apparatus identification information. In this embodiment, the MAC address is used as the apparatus identification information. However, the present invention is not limited to this. For example, a manufacturing number (serial number) assigned to the communication apparatus 151 may be used.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154 and a reception buffer to temporarily store print information received from the information processing apparatus 101 or the like or store various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152. The ROM 152 also stores the serial number for identifying the communication apparatus 151. The serial number is uniquely assigned to identify the communication apparatus 151 by the manufacturer of the communication apparatus 151. The serial number can also be used as the apparatus identification information that can be used to identify the communication apparatus 151. In a case where the communication apparatus 151 is a printer, the use status and remaining amount of ink are collected from the print engine 155 and stored in the ROM 152. The CPU 154 is a system control unit and controls the whole communication apparatus 151.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is necessary to use, for communication of the print job, a communication method that allows high-speed communication. Therefore, the communication apparatus 151 receives the print job via the communication unit 156 that can perform communication at a speed higher than that of the short distance wireless communication unit 157. The display unit 158 is, for example, a panel, and displays data or makes a notification concerning the state of the communication apparatus 151.

Note that a memory such as an external HDD or an SD card may be attached as an optional device to the communication apparatus 151, and information stored in the communication apparatus 151 may be stored in the memory.

After P2P connection or infrastructure connection by Wi-Fi is established between the information processing apparatus 101 and the communication apparatus 151 by connection setting processing in the above-described network setup mode, the information processing apparatus 101 and the communication apparatus 151 can communicate with each other via the established connection. More specifically, for example, the information processing apparatus 101 can transmit, to the communication apparatus 151 via the established connection, a print job for causing the communication apparatus 151 to execute printing or a scan job for causing the communication apparatus 151 to execute a scan.

Figure 2:
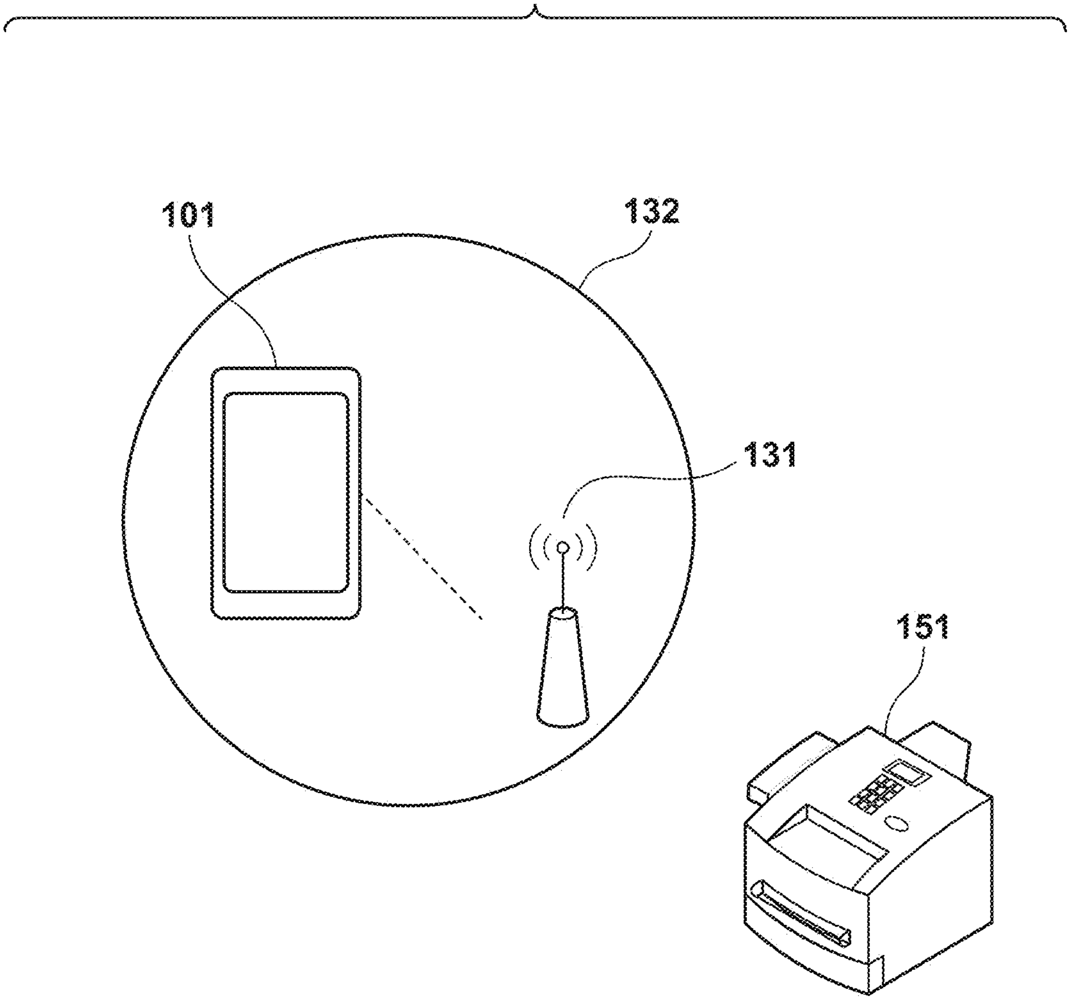
FIG. 2 is a view showing a state in which only the information processing apparatus is connected to an AP.

FIG. 2 shows a state in which only the information processing apparatus 101 is connected to the AP 131 in a network 132 created by the access point 131 in the infrastructure connection mode. The communication apparatus 151 is an apparatus that has not joined the network 132 yet, and needs to undergo connection setting processing for joining the network 132. This embodiment assumes, for example, a case where authentication processing using a password is necessary in this connection setting processing. If, when manually inputting the password, the user inputs an incorrect password, the connection setting processing fails, and is re-executed. Therefore, it is important to prevent erroneous input of the password.

In this embodiment, the setup application operating on the information processing apparatus 101 performs guidance display of the use of the password copy function of the AP that is the function of the OS. Then, the setup application causes the information processing apparatus 101 to execute the connection setting processing using a password acquired by the password copy function.

Figure 6:
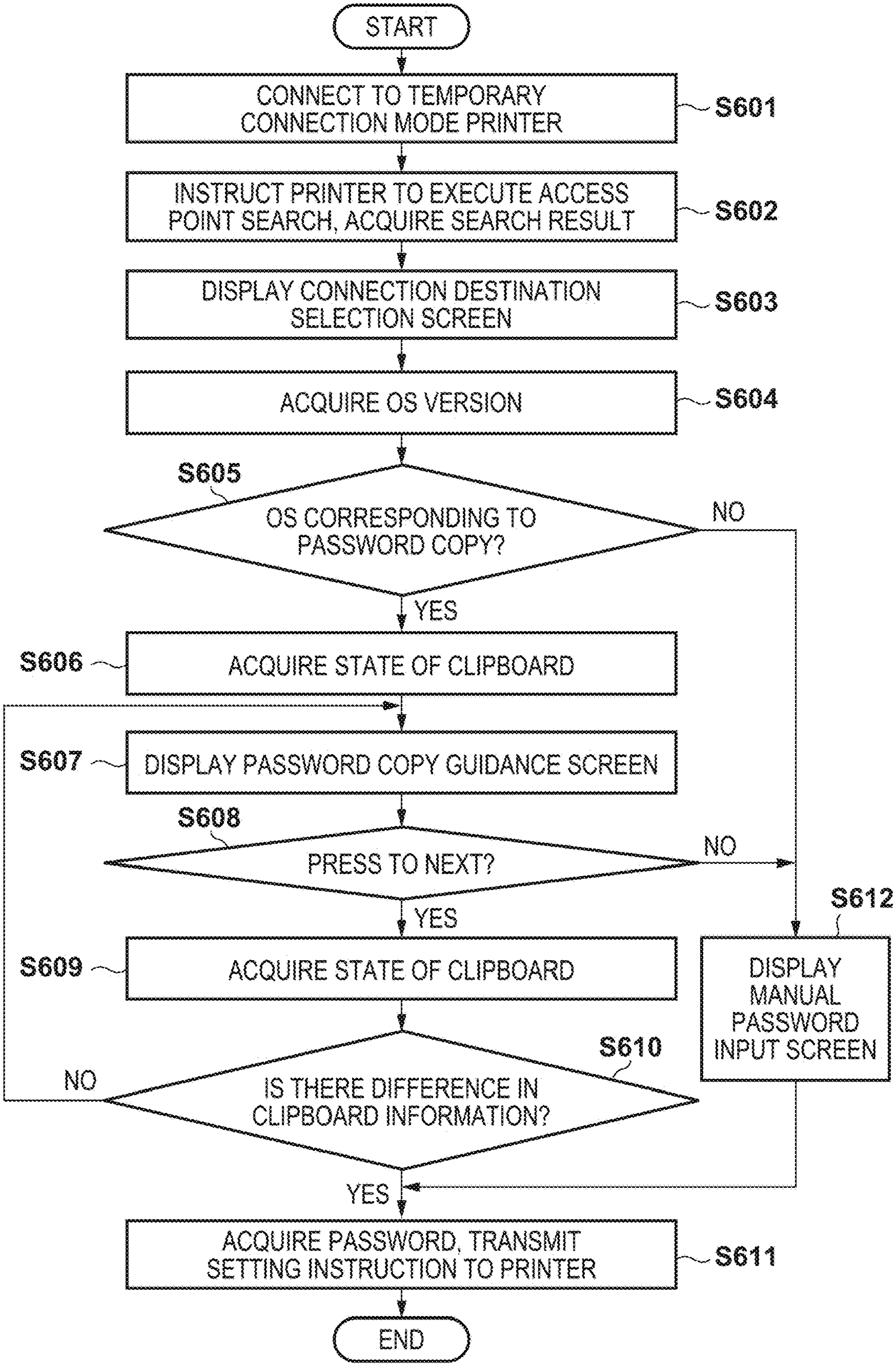
FIG. 6 is a flowchart illustrating connection setting processing.

FIG. 6 is a flowchart illustrating the connection setting processing of the setup application operating on the information processing apparatus 101. The processing shown in FIG. 6 is implemented when, for example, the CPU 103 of the information processing apparatus 101 reads out the program stored in the ROM 104 into the RAM 105 and executes it. The processing shown in FIG. 6 is started when, for example, the setup application is activated in the information processing apparatus 101 and accepts a user instruction of a network setup.

In step S601, the CPU 103 performs connection to the communication apparatus 151 in the network setup mode. The network setup mode is a mode in which the communication apparatus 151 operates as the setup AP using a predetermined SSID and password. The communication apparatus 151 may automatically be activated as the setup AP at the time of an initial setup (at the time of arrival or the like). In this embodiment, the communication apparatus 151 automatically operates as the setup AP at the time of an initial setup. However, the user may perform an operation on the main body panel of the communication apparatus 151 or a main body button operation to cause the communication apparatus 151 to operate in the network setup mode. The CPU 103 detects the predetermined SSID to perform connection to the communication apparatus 151 in the network setup mode.

In step S602, the CPU 103 transmits an instruction to execute a search for an access point around the communication apparatus 151 connected in step S601. Then, the CPU 103 acquires a search result list of access points from the communication apparatus 151. Note that the acquired list is a list of one or a plurality of access points which are found by executing an AP search by the communication apparatus 151 and to which the communication apparatus 151 is connectable. For example, the instruction to execute a search for an access point is executed by designating Management Information Base (MIB) for access point execution instruction using a communication protocol of Simple Network Management Protocol (SNMP). The processing of acquiring the search result list of the access points is also executed by SNMP an MIB from the information processing apparatus 101 to the communication apparatus 151. Note that SNMP and MIB are used in this embodiment but another communication protocol and another data format may be used.

In step S603, the CPU 103 displays, on the display unit 108, a connection destination selection screen for accepting selection of a setting target access point.

Figure 3:
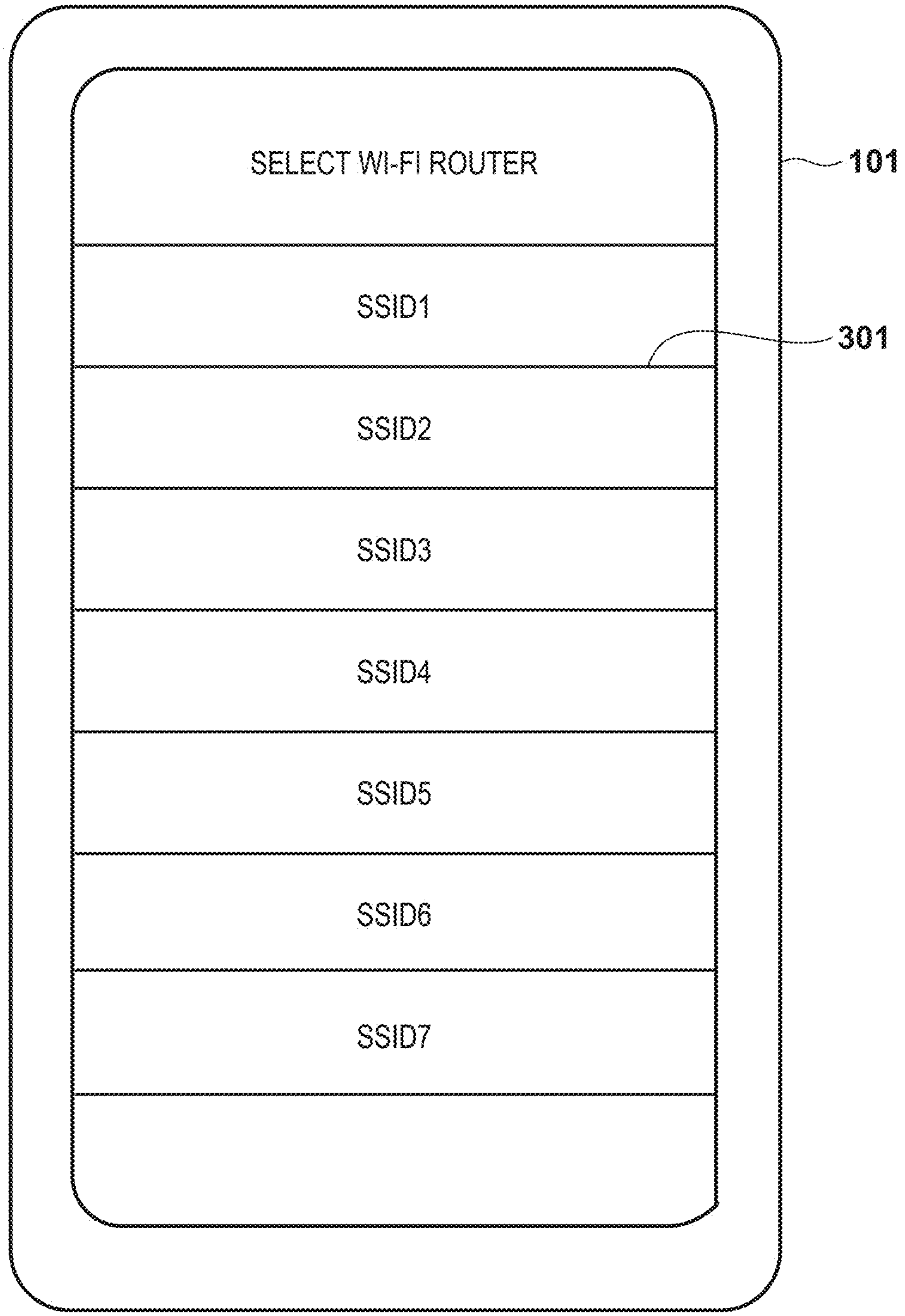
FIG. 3 is a view showing a screen displayed by the information processing apparatus.

FIG. 3 is a view showing an example of the connection destination selection screen. The connection destination selection screen shown in FIG. 3 is a screen displayed on the display unit 108 of the information processing apparatus 101. A list 301 is a list of access points, and the CPU 103 displays the access point list acquired in step S602, and accepts selection of an SSID from the user. This embodiment will exemplify a case where SSID1 is selected.

If the user selects an SSID on the connection destination selection screen, the CPU 103 acquires, in step S604, the version information of the OS using the Application Program Interface (API) of the OS. In step S605, the CPU 103 determines whether the acquired OS version is an OS version supporting the password copy function. In this embodiment, as an example, assume that iOS 16(a predetermined version) or higher supports the password copy function. The password copy function indicates a function of selecting a desired SSID on the system screen of the OS which is a screen for executing the Wi-Fi setting function of iOS, and copying the password. A password having undergone a copy operation is saved in a clipboard as a save area for temporarily saving data. Note that the system screen of the OS is a screen displayed by the system setting application of OS standard. The system setting application of OS standard is an application having a function of controlling wireless connection between the information processing apparatus 101 and another apparatus. More specifically, the system setting application of OS standard has a function of establishing Wi-Fi connection between the information processing apparatus 101 and the access point and a function of managing various kinds of information concerning the Wi-Fi connection between the information processing apparatus 101 and the access point. The various kinds of information concerning the Wi-Fi connection include, for example, the SSID, password, encryption method, authentication method, and the like of the access point to which the information processing apparatus 101 is connected by Wi-Fi. In this embodiment, the system setting application of OS standard can display various kinds of information concerning the Wi-Fi connection by accepting an operation from the user. The information processing apparatus 101 including an OS that supports the password copy function and whose version is equal to or higher than the predetermined version can copy the password displayed, as described above, on the system screen of the OS and save the password in the clipboard. However, the information processing apparatus 101 including an OS that does not support the password copy function and whose version is lower than the predetermined version cannot copy the password displayed, as described above, on the system screen of the OS and save the password in the clipboard. Therefore, if it is determined in step S605 that the OS version is not a version supporting the password copy function, the CPU 103 advances to step S612, and displays a password input screen on the display unit 108.

Figure 4:
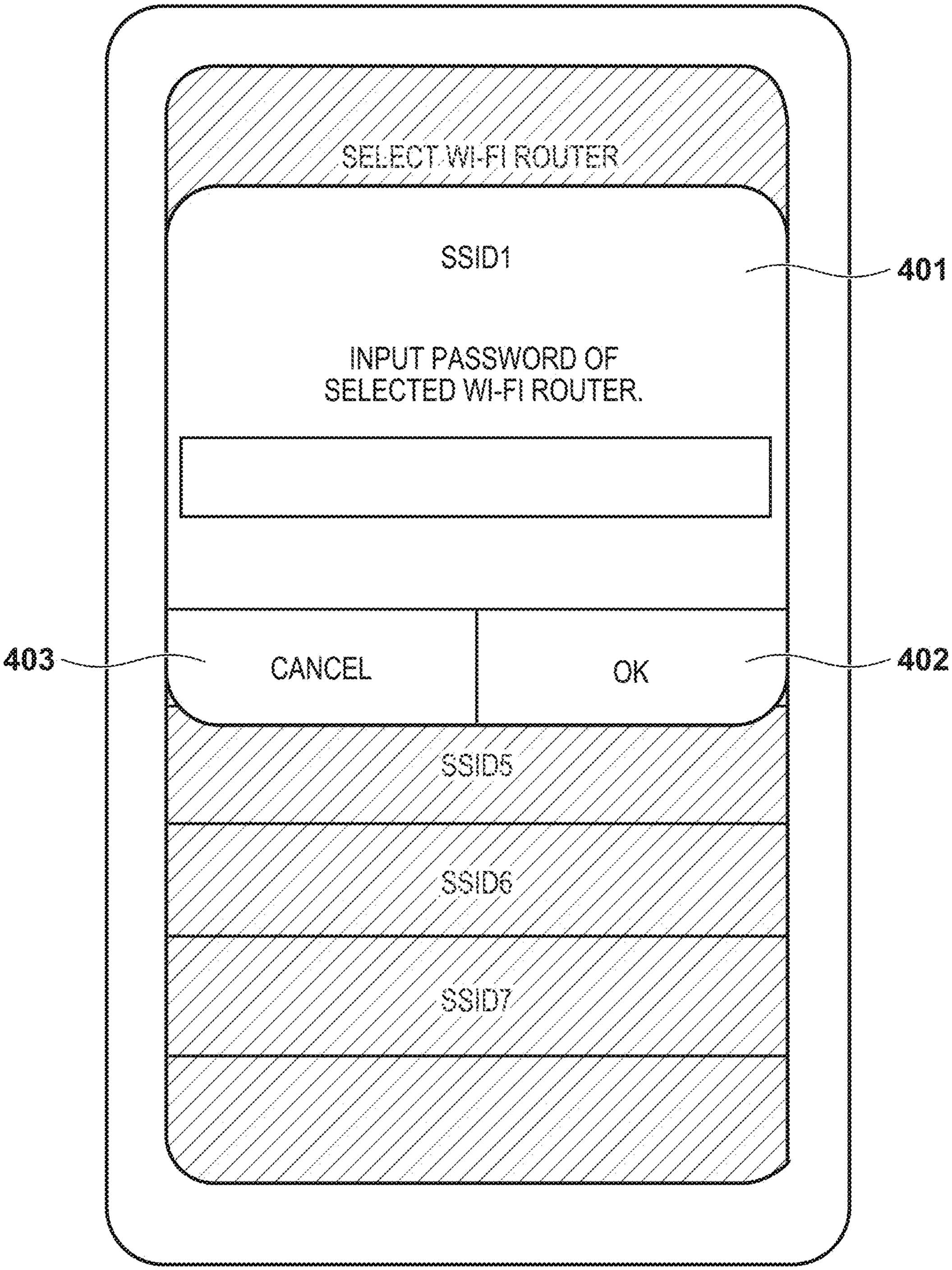
FIG. 4 is a view showing a screen displayed by the information processing apparatus.

FIG. 4 is a view showing an example of the password input screen. The password input screen is a screen displayed on the display unit 108 of the information processing apparatus 101. The password input screen includes display of SSID1 as the SSID information selected by the user, a display area 401 including a text field for accepting a password input, an OK button 402, and a cancel button 403. Upon accepting the password input and the pressing of the OK button 402 from the user, the process advances to step S611. Alternatively, upon accepting the pressing of the cancel button 403 from the user, the processing shown in FIG. 6 ends.

If it is determined in step S605 that the OS version is a version supporting the password copy function, the process advances to step S606. In step S606, the CPU 103 acquires, using the API of the OS, the state of the clipboard as an area that temporarily saves the data when a copy operation is performed on the information processing apparatus 101. That is, state acquisition processing of acquiring the state of the clipboard before displaying a guidance screen to the user is performed.

In step S607, the CPU 103 displays the guidance screen for prompting the user to use the password copy function.

Figure 5:
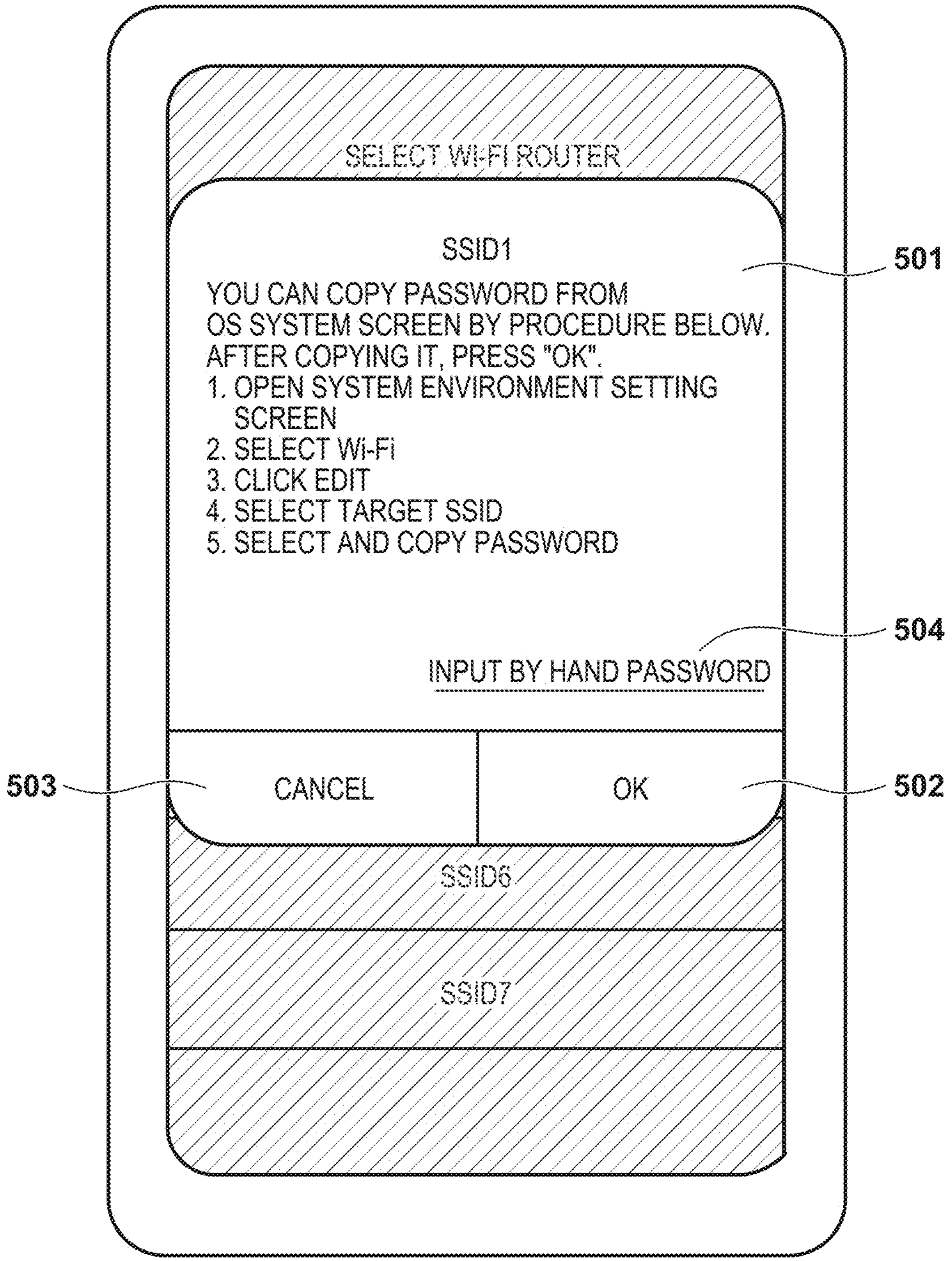
FIG. 5 is a view showing a screen displayed by the information processing apparatus.

FIG. 5 is a view showing an example of the guidance screen. The guidance screen is a screen displayed on the display unit 108 of the information processing apparatus 101. The guidance screen includes an explanation of copying of the password from the system screen of the OS, an area 501 where a link 504 for switching to manual password input is displayed, an OK button 502, and a cancel button 503. More specifically, on the guidance screen, a message for prompting the user to activate the system setting application of OS standard can be displayed. This message corresponds to a message for prompting the user to open (display) the system screen of the OS. On the guidance screen, a message for explaining an operation method that causes the system setting application of OS standard to display various kinds of information concerning the Wi-Fi connection and that is performed on the screen displayed by the system setting application of OS standard can be displayed. On the guidance screen, after causing the system setting application of OS standard to display various kinds of information concerning the Wi-Fi connection, a message for prompting the user to copy the password of the access point can be displayed. When the password of the access point is copied by executing, by the user, the operation promoted by the guidance, the copied password is saved in the clipboard. Note that when the link 504 is pressed, the process returns to the processing of displaying the screen shown in FIG. 4. Furthermore, the guidance screen may include a button for displaying the system screen of the OS. Then, upon the pressing of the button, the CPU 103 may activate the system setting application of OS standard, and cause the system setting application of OS standard to display the screen.

In step S608, the CPU 103 causes the process to branch in accordance with the user operation accepted on the guidance screen. That is, if the pressing of the OK button 502 is accepted on the guidance screen, the process advances to step S609. If the pressing of the cancel button 503 is accepted on the guidance screen, the process advances to step S612, and the CPU 103 displays the password input screen shown in FIG. 4 on the display unit 108.

In step S609, the CPU 103 acquires the information in the clipboard using the API of the OS. That is, state acquisition processing of acquiring the state of the clipboard after displaying the guidance screen to the user is performed. In step S610, the CPU 103 determines whether there is a difference between the clipboard information acquired in step S606 and that acquired in step S609. If it is determined that there is a difference, the process advances to step S611. On the other hand, if it is determined that there is no difference, the processes from step S607 are repeated.

As described above, according to this embodiment, if the information saved in the clipboard changes, it is determined that the user executes the password copy function in accordance with the guidance. Therefore, the processes of steps S606 to S610 can indicate processing for determining whether the password copy function is executed.

If the process advances from step S610 to step S611, the CPU 103 acquires, from the clipboard, the password information copied by the user by the operation displayed on the guidance screen, and transmits the password information as connection setting information of the network setup to the communication apparatus 151. The connection setting information is transmitted using, for example, SNMP and MIB.

As described above, according to this embodiment, it is possible to prevent the user from erroneously inputting a password. In addition, for example, the user need not go to see a password or the like attached to the back surface of a router or the like. As a result, it is possible to improve convenience in a network setup.

Second Embodiment

The second embodiment will be described below concerning points different from the first embodiment. In this embodiment, as an example of a network setup, when a network setup in an information processing apparatus 101 fails, the user is prompted again to perform a setup (reconnection setting) using a password copy function.

Figure 7A:
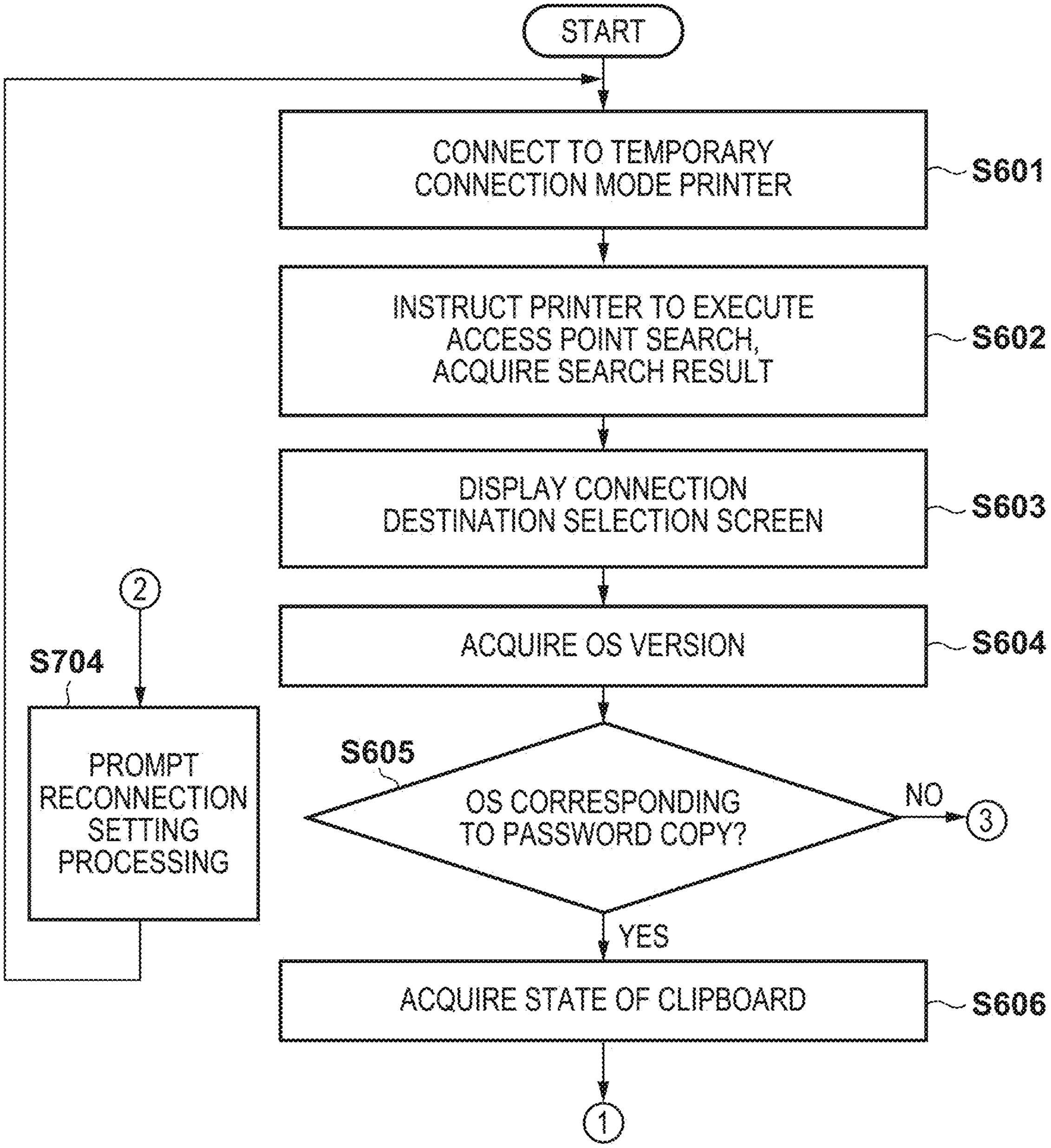
FIGS. 7A and 7B are flowcharts illustrating connection setting processing.
Figure 7B:
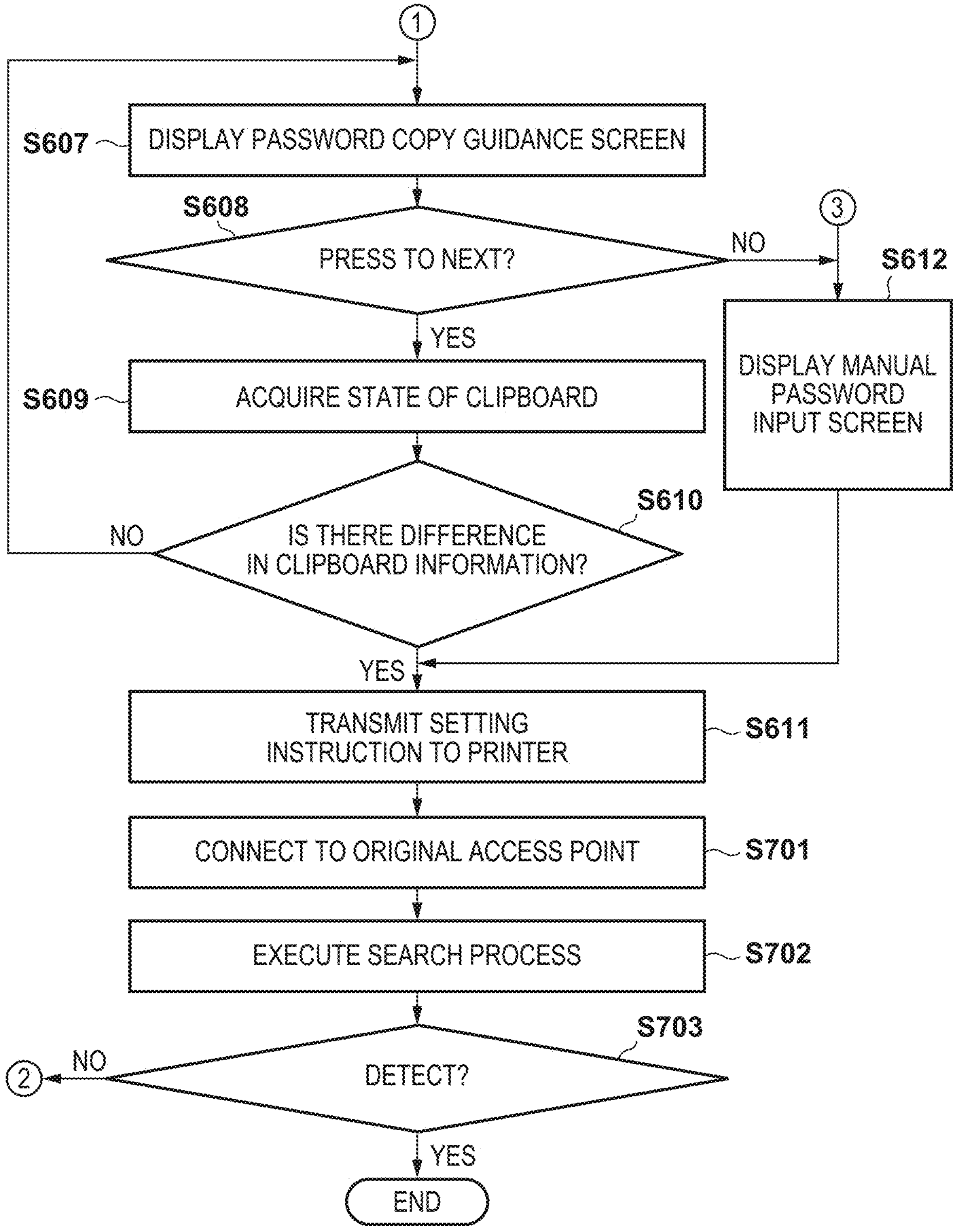

FIGS. 7A and 7B are flowcharts illustrating processing of a setup application operating on the information processing apparatus 101 according to this embodiment. The processing shown in FIGS. 7A and 7B is implemented when, for example, a CPU 103 of the information processing apparatus 101 reads out a program stored in a ROM 104 into a RAM 105 and executes it. The processing shown in FIGS. 7A and 7B is started when, for example, the setup application is activated in the information processing apparatus 101 and accepts a user instruction of a network setup. Steps S601 to S611 of FIGS. 7A and 7B are the same as in FIG. 6 and a description thereof will be omitted.

After connection setting information is transmitted to a communication apparatus 151 in step S611, the CPU 103 returns connection to an access point 131 in step S701. In step S702, the CPU 103 performs search processing of the communication apparatus 151 in the network of the access point 131. The search processing is performed using, for example, SNMP and MIB. For example, the information processing apparatus 101 transmits a search packet onto the network of the access point 131 by broadcast, and confirms, for a predetermined time, whether a response is returned. Note that the example of using SNMP and MIB has been explained but another communication protocol and another data format may be used.

In step S703, the CPU 103 determines whether the communication apparatus 151 is detected. If it is determined that the communication apparatus 151 is detected, the processing shown in FIGS. 7A and 7B ends. After that, communication between the information processing apparatus 101 and the communication apparatus 151 is performed via the access point 131. On the other hand, if it is determined that the communication apparatus 151 is not detected, the process advances to step S704. In step S704, the CPU 103 displays a guidance screen for prompting the user to perform reconnection setting processing.

Figure 8:
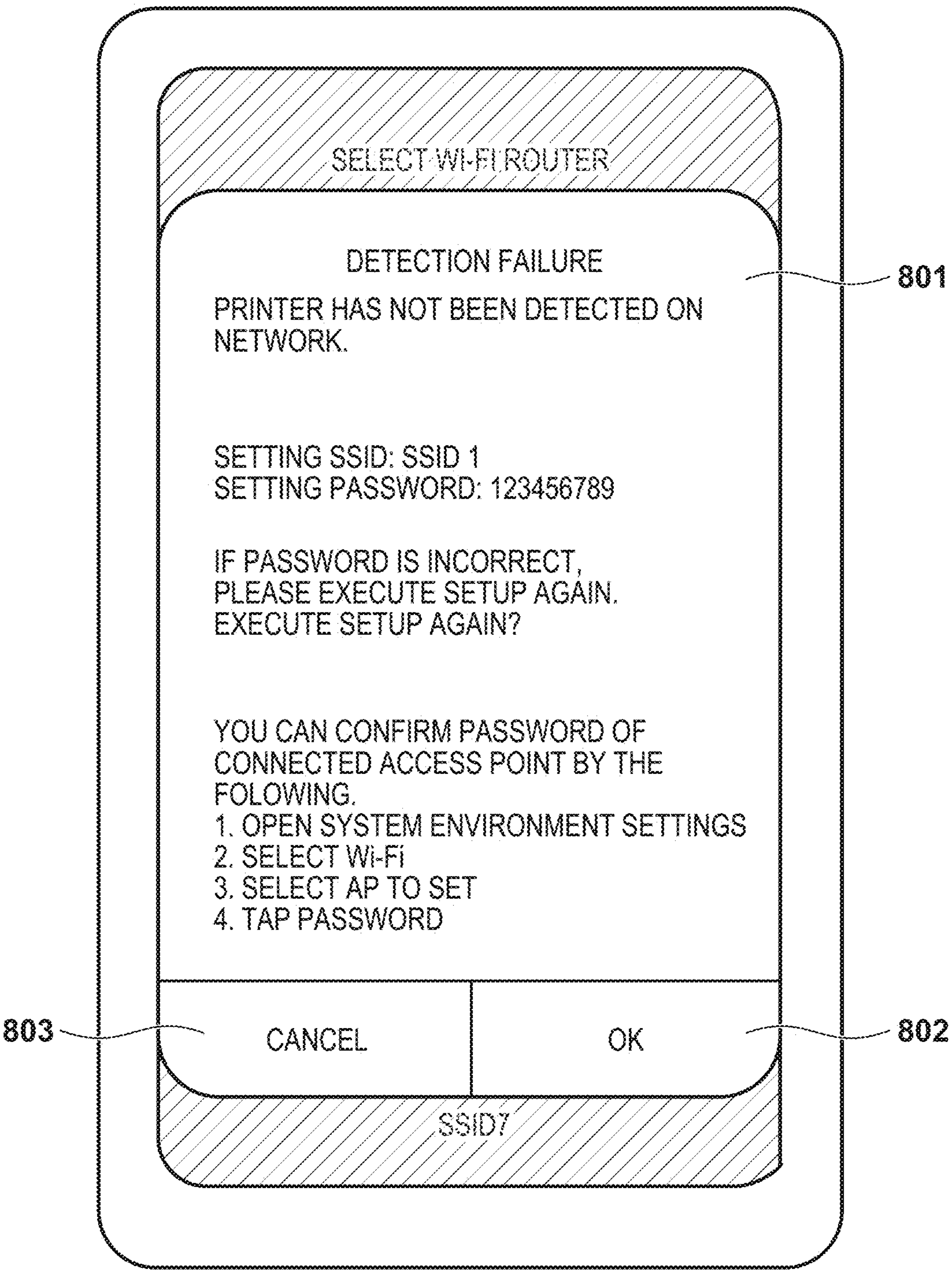
FIG. 8 is a view showing a screen displayed by an information processing apparatus.

FIG. 8 is a view showing an example of the guidance screen for prompting the user to perform the reconnection setting processing. FIG. 8 shows a screen displayed on a display unit 108 of the information processing apparatus 101. The guidance screen for prompting the user to perform the reconnection setting processing includes an area 801 where information representing a setting failure and a message for prompting the user to confirm the password are displayed, an OK button 802, and a cancel button 803. Upon accepting the pressing of the OK button 802, the processes from step S601 are repeated. Upon accepting the pressing of the cancel button 803, the processing shown in FIGS. 7A and 7B ends.

As described above, according to this embodiment, even if, as a result of a network setup, connection to an access point corresponding to a selected SSID has failed and the user is prompted to perform reconnection setting processing, it is possible to prompt the user to perform a setup again using the password copy function of the OS. This can prevent the user from erroneously inputting the password, and improve convenience in a network setup.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-147894, filed Sep. 12, 2023, which is hereby incorporated by reference herein in its entirety.

What is claimed is:

1. A control method for an information processing apparatus on which a first application for transmitting, to a communication apparatus outside the information processing apparatus, setting information for connecting to an access point outside the information processing apparatus, and a second application for managing a password of the access point outside the information processing apparatus are able to operate, comprising:

determining whether an operating system (OS) of the information processing apparatus is an OS supporting a predetermined function of storing, in a clipboard, a password of the access point outside the information processing apparatus;

based on determining that the OS of the information processing apparatus is the OS supporting the predetermined function, performing control to display, by the first application, a first screen provided by the first application, wherein the first screen includes guidance to cause a second screen provided by the second application to be displayed, and the second screen is a screen with respect to a password which is managed by the second application and which is of the access point outside the information processing apparatus; and after the guidance is displayed, performing, by the first application, control to transmit to the communication apparatus the setting information for connecting to the access point outside the information processing apparatus, wherein the setting information includes a password which is acquired by the first application, wherein the first screen is a screen with respect to the predetermined function and is a screen for prompting a user to execute the predetermined function.

2. The method according to claim 1, further comprising accepting, from a user, a specific operation for specifying, as a predetermined access point to be connected to the communication apparatus, the access point outside the information processing apparatus, wherein in a case where the specific operation is accepted from the user, the first screen is displayed, and the setting information transmitted to the communication apparatus is information for connection to the predetermined access point.

3. The method according to claim 2, further comprising acquiring in a first acquiring process, from the communication apparatus, information of a list of access points outside the information processing apparatus found by a search executed by the communication apparatus, wherein the specific operation is selection of one access point from the list of the access points found by the search executed by the communication apparatus.

4. The method according to claim 1, wherein based on a fact that the user executes a predetermined operation after the first screen is displayed, control is executed so that an input screen for accepting a password input from the user is displayed by the first application.

5. The method according to claim 1, wherein the first screen is a screen for displaying an operation method for copying the password of the access point, that is executed on the second screen.

6. The method according to claim 1, wherein the first screen includes a button for activating the second application.

7. The method according to claim 1, further comprising:

establishing connection between the access point corresponding to the password acquired by the first application and the information processing apparatus after the setting information is transmitted to the communication apparatus;

searching for the communication apparatus on a network of the access point corresponding to the password acquired by the first application; and displaying, by the first application, based on a fact that the communication apparatus is not found on the network of the access point corresponding to the password acquired by the first application, a screen corresponding to the fact that the communication apparatus is not found on the network of the access point corresponding to the password acquired by the first application.

8. The method according to claim 7, wherein the screen corresponding to the fact that the communication apparatus is not found on the network of the access point corresponding to the password acquired by the first application includes same content as the guidance.

9. The method according to claim 1, further comprising transmitting, to the communication apparatus, one of a print job for causing the communication apparatus to execute printing and a scan job for causing the communication apparatus to execute a scan, by communication between the information processing apparatus and the communication apparatus via the connection established by transmitting the setting information.

10. The method according to claim 1, wherein the second application is a system setting application of OS standard of the information processing apparatus.

11. The method according to claim 1, wherein based on a fact that the OS of the information processing apparatus is not the OS supporting the predetermined function, control is executed so the first screen is not displayed by the first application.

12. The method according to claim 11, wherein based on the fact that the OS of the information processing apparatus is not the OS supporting the predetermined function, control is executed so that an input screen for accepting a password input from the user is displayed by the first application without displaying the first screen by the first application.

13. The method according to claim 1, wherein the OS supporting the predetermined function is iOS whose version is not lower than iOS 16.

14. The method according to claim 1, further comprising acquiring as a second acquiring process, the password of the access point saved in the clipboard after the first screen is displayed, wherein the setting information transmitted to the communication apparatus includes the password of the access point acquired by the second acquiring process.

15. The method according to claim 14, wherein based on a fact that a password of the access point outside the information processing apparatus is saved in the clipboard by the predetermined function after the first screen is displayed, the password saved in the clipboard is acquired.

16. The method according to claim 14, wherein based on a fact that there is a difference between a state of the clipboard at a first timing and a state of the clipboard at a second timing which is after the first timing and after the first screen is displayed, a password of the access point outside the information processing apparatus saved in the clipboard is acquired.

17. The method according to claim 16, wherein the first timing is a timing before the first screen is displayed.

18. The method according to claim 1, further comprising establishing a connection between the access point outside the information processing apparatus and the information processing apparatus after the setting information is transmitted to the communication apparatus.

19. The method according to claim 1, wherein a connection, used for a transmission of the setting information between the information processing apparatus and the communication apparatus is a connection in accordance with standard of IEEE 802.11 series.

20. The method according to claim 1, wherein a connection, used for a transmission of the setting information between the information processing apparatus and the communication apparatus is a connection is a connection in accordance with Bluetooth, Bluetooth Classic, or Bluetooth Low Energy.

21. The method according to claim 1, further comprising performing control to display, by the first application, a text field for accepting an input of a password from a user, wherein the setting information including the password inputted on the text field.

22. The method according to claim1, wherein the second application includes a function of managing predetermined information which is information of an access point to which the information processing apparatus is being connected.

23. The method according to claim 22, wherein the predetermined information is displayed on the second screen.

24. The method according to claim 23, wherein the predetermined information includes at least one of a Service Set Identifier (SSID), a password, an encryption method, or an authentication method.

25. An information processing apparatus on which a first application for transmitting, to a communication apparatus outside the information processing apparatus, setting information for connecting to an access point outside the information processing apparatus, and a second application for managing a password of the access point outside the information processing apparatus are able to operate, comprising:

at least one processor and at least a memory coupled to the at least one processor and having instructions stored thereon, and when executed by the at least one processor, cause the at least one processor to:

determine whether an operating system (OS) of the information processing apparatus is an OS supporting a predetermined function of storing, in a clipboard, a password of the access point outside the information processing apparatus;

based on determining that the OS of the information processing apparatus is the OS supporting the predetermined function, perform control to display, by the first application, a first screen provided by the first application, wherein the first screen includes guidance to cause a second screen provided by the second application to be displayed, and the second screen is a screen with respect to a password which is managed by the second application and which is for the access point outside the information processing apparatus; and after the guidance is displayed, perform, by the first application, control to transmit to the communication apparatus outside the information processing apparatus the setting information for connecting to the access point outside the information processing apparatus, wherein the setting information includes a password which is acquired by the first application, wherein the first screen is a screen with respect to the predetermined function and is a screen for prompting a user to execute the predetermined function.

26. A non-transitory computer-readable storage medium that stores a predetermined application program including instructions for controlling an information processing apparatus on which a first application for transmitting, to a communication apparatus outside the information processing apparatus, setting information for connecting to an access point outside the information processing apparatus, and a second application for managing a password of the access point outside the information processing apparatus are able to operate and which includes one or more processors, wherein the instructions, when executed by one or more processors of the information processing apparatus, cause the information processing apparatus to perform a method, the method comprising:

determining whether an operating system (OS) of the information processing apparatus is an OS supporting a predetermined function of storing, in a clipboard, a password of the access point outside the information processing apparatus;

based on determining that the OS of the information processing apparatus is the OS supporting the predetermined function, performing control to display, by the first application, a first screen provided by the first application, wherein the first screen includes guidance to cause a second screen provided by the second application to be displayed, and the second screen is a screen with respect to a password which is managed by the second application and which is of for the access point outside the information processing apparatus; and after the guidance is displayed, performing, by the first application, control to transmit to the communication apparatus the setting information for connecting to the access point outside the information processing apparatus, wherein the setting information includes a password which is acquired by the first application, wherein the first screen is a screen with respect to the predetermined function and is a screen for prompting a user to execute the predetermined function.

* * * * *